United States Patent Office 3,047,785
Patented July 31, 1962

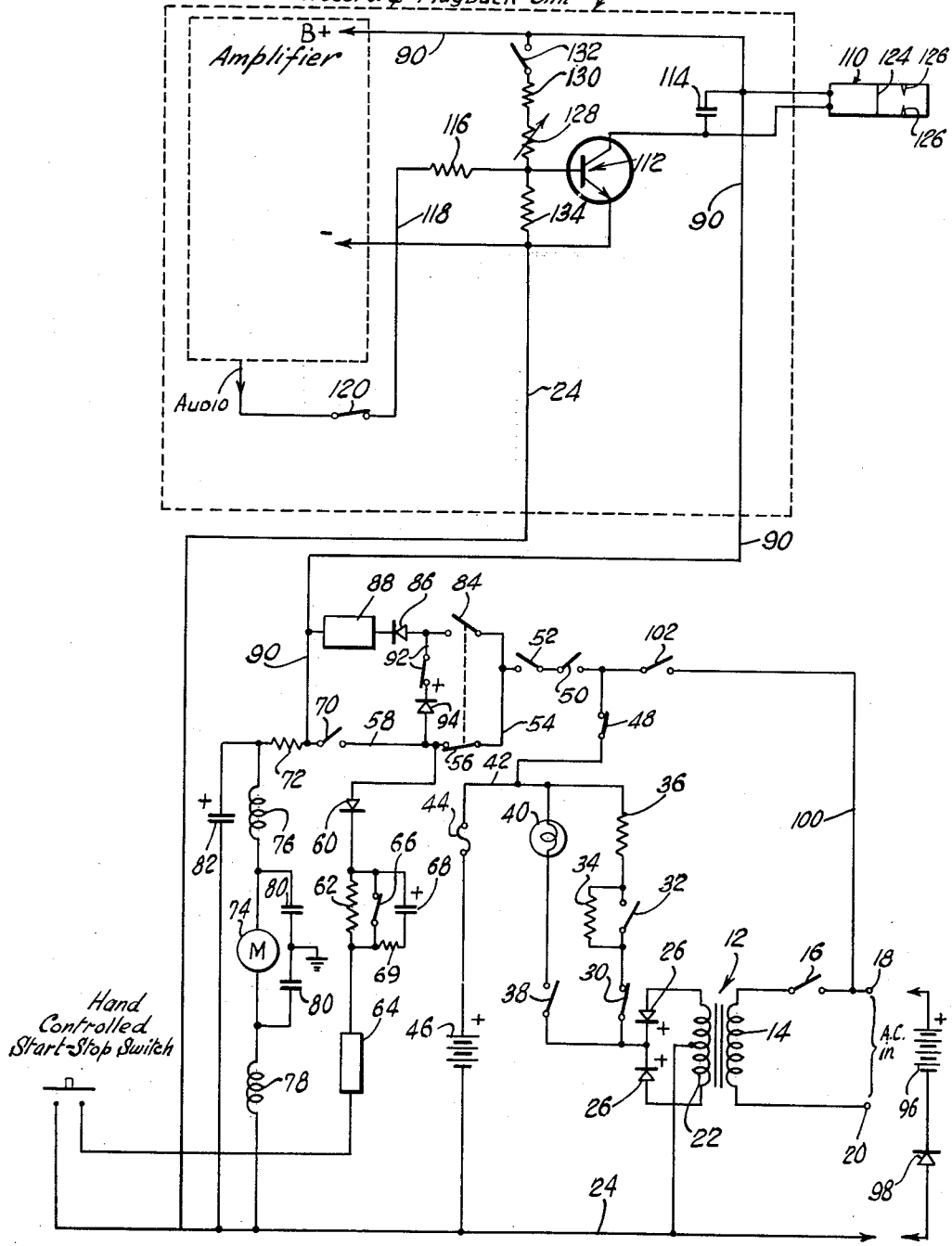

3,047,785
POWER SUPPLY FOR PORTABLE DICTATING MACHINE AND THE LIKE
Roger C. Curtis, New Haven, and Frederick W. Roberts, Fairfield, Conn., assignors to Dictaphone Corporation, Bridgeport, Conn., a corporation of New York
Filed Nov. 10, 1960, Ser. No. 68,414
11 Claims. (Cl. 318—139)

This invention relates to a self-contained arrangement for powering a dictating mahine and the like.

An object of this invention is to provide a compact and reliable self-contained power supply for a dictating machine and the like.

Another object is to provide a supply of this kind using a storage battery which is protected against over-charing and excessive discharge.

A further object is to provide a power supply of this kind which operates either from the usual power line or from a self-contained battery.

These and other objects will in part be understood from and in part pointed out in the following description.

In co-pending application, Serial No, 728,646, filed April 15, 1958, there is described a very efficient, very compact belt-record dictating machine. The size of this machine, because of the new mechanism, is considerably smaller and lighter than its predecessor. In fact this new machine, though a standard office dictating machine, is small enough and compact enough to be quite portable. The present invention was stimulated by the desire to make such a machine truly portable and able to operate independently of an external power line.

In accordance with the present invention a standard model dictating machine such as described in the aforesaid patent application, is internally fitted with a small but powerful re-chargeable storage battery and provided with special circuits and interlocks for maintaining the battery in proper operating condition. This machine derives all its operating power from its battery and to conserve the battery, a charging circuit which can be connected to the A.C. power line is provided. When so connected, the battery is continually being re-charged from the power line as fast as current is drawn from the battery by the machine. Thus, the battery can be maintained in fully charged condition and immediately ready for use and then is disconnected from the power line for portable operation where suitable external power is not available. When the charge on the battery has been depleted beyond a safe point, an audible warning signal is given the operator who can thereafter connect the machine to the power line for re-charging the battery. This arrangement gives the machine great versatility but yet it has the same operating convenience and efficiency of a standard machine. The invention in one aspect is particularly designed to overcome certain limitations inherent in using a nickel-cadmium storage battery so that the outstanding advantages in using such a battery can be fully realized in a commercially practical machine.

A better understanding of the invention together with a fuller appreciation of its many advantages will best be gained from the following description given in connection with the accompanying drawing which is a circuit diagram of a power supply embodying features of the invention.

Referring to the lower righthand portion of the drawing, the circuit 10 shown in the drawing includes a power input transformer 12 whose primary winding 14 is connected through a switch 16 to a pair of terminals 18 and 20 which are adapted to be connected to an A.C. power line, for example, 110 volts, 60 cycles. The secondary winding 22 of this transformer has a center tap connected to a ground or negative bus 24, the outer ends of the winding being connected to a pair of full wave rectifiers 26. The common junction of these rectifiers is connected via a lead 28 to two conductive branches. One branch includes a switch 30, a second switch 32 shunted by a resistor 34 and finally a resistor 36. The other branch comprises a switch 38 in series with a temperature variable resistor 40, which for example is a light bulb filament.

These two branches join at a lead 42 which is connected through a fuse 44 to the positive side of a storage battery 46. The latter is advantageously a twelve volt nickel-cadmium battery which has the advantages of long life, small size for a given power output, and freedom from leakage of electrolyte. Important restrictions on such a battery, however, are that it not be over-charged and that its output voltage must not be allowed to drop below a minimum value before recharging, otherwise permanent damage to the battery may result. But, the present invention safeguards against these dangers, as will be explained in detail presently.

It will be noted that battery 46 and the direct voltage output of transformer 12 are connectable in parallel through either of switches 32 or 38. Thus, when circuit 10 is energized from the A.C. power line, battery 46, which is the primary power source for the circuit, will be supplied with electric charge from the transformer. The amount of charge supplied is determined by whether the current flows through resistor 40 or through resistor 36, alone or in series with resistor 34, in passing to the battery.

As is explained in detail in the aforesaid co-pending application a dictating machine with which circuit 10 is associated has a hand-controlled switch, located on a hand microphone, for example, for starting and stopping the record drive of the machine, and a cradle switch in the machine which is opened when the hand microphone is placed on a hook on the side of the machine when not in use. The start-stop switch operates a relay which in turn opens and closes a number of switches, such as switches 30 and 38 already mentioned. Switch 32 is one section of the cradle switch and is opened when the microphone is hung-up and not in use.

As shown in the center portion of the diagram the positive side of battery 46 and lead 42 are connected through a normally closed switch 48 and through a pair of switches 50 and 52 to a lead 54. Switch 50 is ganged with switch 16, the two being closed by turning an "on-off volume control" knob on the dictating machine. Switch 52 is the other section of the cradle switch and is closed along with switch 32 when the hand microphone is hung up.

The lower side of lead 54 is connected through a normally closed switch 56 to a lead 58. Branching downward from this lead is a connection to a diode 60, which prevents reverse current flow, and which is in series with a resistor 62 and the winding of a start-stop relay 64. The latter, as mentioned above, controls switches 30 and 38 together with other switches to be described shortly. Resistor 62 is shunted by a switch 66 and by a large storage capacitor 68 in series with a small decoupling resistor 69. Switch 66 is opened by relay 64 when it is energized and this puts resistor 62, which has a moderate ohmage, in series with the relay winding. The size of resistor 62 is relative to the current required by the relay so that if the supply voltage is above a safe minimum value, sufficient current flows through resistor 62 to the relay to keep it energized after switch 66 opens. If the supply voltage falls below this minimum, then when switch 66 opens the current to the relay will fall below the amount necessary to keep it energized. Thereupon, switch 66 closes and bypasses resistor 62, and the above cycle of opening and closing the switch, of energizing and of failure to energize the relay, is repeated at a rapid rate. The opening and closing of the switch produces an audible warning to the person using the machine that the battery is in need of recharging and also, as will appear, prevents operation of the machine. These are important safety features.

Lead 58 is also connected through a switch 70 (which is closed by relay 64 when energized), through a decoupling resistor 72 to a motor 74 in series with two chokes 76 and 78. The motor itself is shunted by two filter capacitors 80 whose common junction is grounded. The overall motor circuit is by-passed by a large filter capacitor 82.

When start-stop relay 64 is energized and battery 46 is sufficiently charged, motor 74 will be energized by relay switch 70 and kept running until the start-stop switch controlling the relay is released. This is the normal condition of operation. However, in the event that the charge on battery 46 has run down, when the start-stop switch is closed switch 70 will be opened and closed repeatedly, along with switch 66 previously described, and the motor therefore will effectively not be energized. This prevents the motor from running until the battery is recharged.

Assuming the battery has been discharged to the point that relay 64 will no longer pull in and hold switch 66 open, the battery can be recharged in the following manner. Terminals 18 and 20 are connected to the A.C. line and switch 16 is closed by means of the volume control knob on the machine. Also, switch 32 is closed by removing the microphone from the cradle switch. This establishes a charging path from the rectified output of transformer 12 through resistor 36 to battery 46. The size of resistor 36 is chosen so that the battery charges at a safe rate and in reasonable time, for example, overnight. Thereafter the machine is ready for use again operating solely on the power of battery 46, if desired. Of course, if the battery were not yet recharged, the machine could still be energized from the power line. Even though the battery may be fully charged and the microphone hung up so that switch 32 is open as shown, a trickle of electric current can flow from the power line through resistors 34 and 36 in series to the battery to keep it at a peak charge.

When the start-stop switch is closed to energize relay 64 and start motor 74, among other things switch 30 opens and switch 38 closes. This puts temperature sensitive resistor 40 in circuit instead of resistor 36 and increases the rectified current which can be drawn from the power line to compensate for the extra current drawn by motor 74. The resistance characteristics of resistor 40 are chosen so that they vary to allow slightly more or less current to flow in accordance with the demands of the motor if the load or supply voltage varies.

To provide an audible signal to the person using the machine to indicate whether it is conditioned for recording or, instead, for playback, circuit 10 is provided with the following elements. The upper end of lead 54 is connected through a switch 84, and a diode 86 to a buzzer, 88, the other end of which is connected via a portion of lead 90 to the junction of switch 70 and resistor 72. Under certain conditions the buzzer is in series with motor 74 and will then be energized to give an audible signal. Under other conditions, the buzzer will be shorted out or otherwise not energized and will make no sound. An alternate current path to the buzzer is provided through a switch 92 and a diode 94 whose lower end is connected to lead 58 at the left of switch 56.

Switches 56 and 84 are ganged together and normally are as shown. However, when the end of the record being played in the machine is reached, a mechanical limit arm reverses both switches thus establishing a circuit from the battery through switch 84 (and switches 48, 50 and 52). The opening of switch 56, of course, stops the motor while the closing of switch 84 energized buzzer 88 to give a signal to the operator. Switch 92 is closed when the machine is set in neutral or in playback condition, and in either state until start-stop relay 64 is energized and switch 70 is closed, the buzzer will sound. When switch 70 is closed, however, the buzzer will be bypassed and thus de-energized. On the other hand, switch 92 is open when the machine is set to record and, assuming switches 56 and 84 to be as shown, the buzzer will not be energized.

Circuit 10 can also be energized, instead of by a power line connection to terminals 18 and 20, by an external battery 96 connectable between terminal 18 and negative bus 24. To prevent ill effects if the battery is connected with reverse polarity, a diode 98 is placed in series with it. Diodes 60 and 86, previously mentioned, also to some extent safeguard against this. When external battery 96 is connected to the circuit a circuit is established from terminal 18 via a lead 100 through a switch 102 to switch 50, switch 48 being opened and switch 102 being closed by a prong of the plug of external battery 96 when it is connected.

Circuit 10 is provided with a meter for measuring the battery voltage and also for indicating the modulation level during recording. To this end, and as illustrated in the upper right portion of circuit 10, an electromagnetic meter 110 is connected between positive lead 90 and the collector of transistor 112. The winding coil of the meter provides a direct current path for the transistor from the supply battery, the meter being bypassed at higher audio frequencies by a capacitor 114. The base of transistor 112 is connected through a resistor 116, a lead 118 and a switch 120 to a lead 122 by means of which audio signals are applied to the transistor during recording. The lower frequency components of these signals cause an indicator 124 in meter 110 to deflect toward the left or beyond the index pointers 126 on the face of the meter. The amount of deflection of the pointer gives the person dictating an indication of signal level.

When the machine is set for playback or in neutral, meter 110 is used to indicate the voltage of supply battery 46. This is accomplished by opening switch 120 and by connecting the base of transistor 112 through a variable resistor 128, a resistor 130 and a switch 132 (which is closed when switch 120 is opened) to positive lead 90. Current flowing through these resistors and a resistor 134 applies a fixed portion of the supply voltage to the base of transistor 112. Thus, the meter gives a reading proportional to the supply voltage and the operator is able to tell visually whether or not the battery needs recharging. Various elements of the recording and playback amplifier associated with circuit 10 have not been shown since these elements can be standard ones known in the art.

The above description is intended in illustration and not in limitation of the invention. Various minor changes in the embodiment illustrated may occur to those skilled in the art and can be made without departing from the spirit or scope of the invention as set forth.

We claim:

1. A self-contained power supply for a dictating machine and the like, said supply including a re-chargeable storage cell, an electro-mechanical relay for controlling operation of the machine, means including a first resistor connecting said relay in series with said battery and a first switch controlled by said relay and shunting said resistor, said first switch being closed when said relay is not energized and open when said relay is connected to said battery and the voltage thereof is below a given value said relay will first be energized and then not energized in rapid succession to prevent operation until said battery is re-charged.

2. The circuit in claim 1 wherein said relay controls a second switch which is closed when said relay is energized to connect a current supply lead in said machine to said battery.

3. The circuit in claim 1 in further combination with an A.C. rectified current power supply adapted to be connected to a power line, and battery charging means controlled by said relay and providing a plurality of separate charging paths from said A.C. supply to said battery.

4. The circuit in claim 3 wherein said A.C. supply is connected to said battery through an externally controlled switch and a charging resistor to supply a trickle charge to said battery when said externally controlled switch is actuated, one of said charging paths controlled by said relay being in series with said externally controlled switch.

5. The circuit in claim 1 in further combination with an indicating meter connectable to said battery to indicate the voltage thereof and also connectable to elements in said machine to indicate the operation thereof.

6. A power supply and driving arrangement for a dictating machine and the like, said arrangement including a motor, a start-stop relay having a plurality of switch contacts, a nickel-cadmium storage battery, means including an externally controlled switch connecting said relay to said battery, a power transformer connectable to an A.C. power line, rectifier means for obtaining direct voltage power from said transformer, a first charging circuit including a first switch contact connecting said rectifier means to said battery, a second charging circuit including a second switch contact connecting said rectifier means to said battery, said first contact being closed when said second contact is open and vice versa, and means including a third switch contact connecting said motor to said battery, said third contact being opened and closed in unison with said second contact.

7. The arrangement in claim 6 wherein said first charging circuit includes a resistor shunted by a second externally controlled switch so that a dual charging rate for said battery is provided.

8. The arrangement in claim 6 wherein said second charging circuit includes a temperature variable resistor to compensate for variations in the load on said motor.

9. The arrangement in claim 6 wherein said relay is connected to said battery through a resistor shunted by a fourth relay contact which is opened when said relay is energized, said resistor permitting less than enough current to flow to said relay to keep it energized when the voltage of said battery falls below a given value.

10. The arrangement of claim 6 wherein said third relay contact is shunted by a buzzer so that an audible warning is given when said contact is open.

11. In a dictating machine and the like, a motor, start-top means having a plurality of switch contacts, a rechargeable storage battery, a power transformer connectable to an A.C. power line, rectifier means for obtaining direct voltage power from said transformer, a first charging circuit including a first of said switch contacts connecting said rectifier means to said battery, a second charging circuit including a second of said switch contacts connecting said rectifier means to said battery, said first contact being closed when said second contact is open and vice versa, and means including a third of said switch contacts connecting said motor to said battery, said third contact being opened and closed in unison with said second contact.

References Cited in the file of this patent
UNITED STATES PATENTS

| | | |
|---|---|---|
| 2,423,134 | Winkler | July 1, 1947 |
| 2,539,987 | Burger | Jan 30, 1951 |